(12) United States Patent
Yang (10) Patent No.: US 8,990,362 B2
(45) Date of Patent: Mar. 24, 2015

(54) VIRTUAL MACHINE PROVISIONING ENGINE

(75) Inventor: Yingwei Yang, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 376 days.

(21) Appl. No.: 12/971,680

(22) Filed: Dec. 17, 2010

(65) Prior Publication Data

US 2012/0158920 A1    Jun. 21, 2012

(51) Int. Cl.
| | |
|---|---|
| G06F 15/177 | (2006.01) |
| G06F 9/50 | (2006.01) |
| G06F 9/445 | (2006.01) |
| G06F 15/16 | (2006.01) |
| G06F 9/455 | (2006.01) |
| G06F 9/46 | (2006.01) |

(52) U.S. Cl.
CPC .............. *G06F 9/5077* (2013.01); *G06F 8/61* (2013.01); *G06F 9/44505* (2013.01); *G06F 9/45533* (2013.01)
USPC .............. 709/220; 709/203; 709/218; 718/1; 718/100

(58) Field of Classification Search
USPC ................ 709/203, 218, 220; 718/1, 100
See application file for complete search history.

(56) References Cited

U.S. PATENT DOCUMENTS

| | | | |
|---|---|---|---|
| 7,577,722 B1 | 8/2009 | Khandekar et al. | |
| 2004/0046787 A1* | 3/2004 | Henry et al. | 345/744 |
| 2004/0252123 A1* | 12/2004 | Estrada et al. | 345/501 |
| 2005/0262194 A1* | 11/2005 | Mamou et al. | 709/203 |
| 2007/0171921 A1* | 7/2007 | Wookey et al. | 370/401 |
| 2007/0180448 A1* | 8/2007 | Low et al. | 718/1 |
| 2007/0192329 A1* | 8/2007 | Croft et al. | 707/10 |
| 2007/0198656 A1* | 8/2007 | Mazzaferri et al. | 709/218 |
| 2008/0201709 A1 | 8/2008 | Hodges | |
| 2009/0300057 A1* | 12/2009 | Friedman | 707/102 |

FOREIGN PATENT DOCUMENTS

EP    2043320    4/2009

OTHER PUBLICATIONS

Simon, Stefan, "Dynamic Data Center for Hosters", Based on information and belief available, at least as early as Jul. 16, 2010, 4 pages.
Microsoft Tech Days, United Kingdom 2010, Sohbat Ali, Microsoft Virtualization Summit, "Builiding a Foundation for Your Private Cloud", Apr. 2010, 25 pages.

(Continued)

*Primary Examiner* — David Lazaro
*Assistant Examiner* — Vitali Korobov
(74) *Attorney, Agent, or Firm* — Kate Drakos; David Andrews; Micky Minhas (57) ABSTRACT

Embodiments described herein extend to methods, systems, and computer program products for setting up, configuring, and customizing one or more virtual machines. A scenario definition file may be accessed and parsed to provide information to a virtual machine provisioning server. A virtual machine is provisioned and instantiated according to the information contained in the scenario definition file. A virtual machine is instantiated upon a host machine. Upon instantiation, a virtual machine communicates with a custom action service to execute an action upon the virtual machine.

20 Claims, 3 Drawing Sheets

(56) References Cited

OTHER PUBLICATIONS

IBM, Automate provisioning to help optimize data center resources and reduce complexity in the virtual environment, Based on information and belief available, at least as early as Jul. 16, 2010, 4 pages.

Yuen, Edwin, Real Control with Virtual Machine Manager 2007, Jan. 2008, 6 pages.

IT Core Blog, "Microsoft System Center Virtual Machine Manager Self-Service Portal 2.0 Release Candidate", Jul. 12, 2010, 2 pages.

* cited by examiner

VIRTUAL MACHINE PROVISIONING ENGINE

CROSS-REFERENCE TO RELATED APPLICATIONS

N/A

BACKGROUND

Computer systems and related technology are ubiquitous and affect many aspects of society. Indeed, the computer system's ability to process information has transformed the way we live, work, and play. Computer systems and applications now commonly perform a host of tasks such as word processing, scheduling, accounting, etc., that, prior to the advent of the computer system, were performed manually. Computer systems and applications are also used in myriad ways in recreation and entertainment such as music, video, and gaming. Computer systems and applications are used for such diverse applications as the Global Positioning System (GPS), determining the correct fuel-to-air mixture for an automobile's engine, and for determining and controlling the efficiency of a home heating system.

Computer systems have also been coupled to other computer systems and to other electronic devices to form both wired and wireless computer networks over which the computer systems and other electronic devices can transfer electronic data. Accordingly, the performance of many computing tasks are distributed across a number of different computer systems and/or a number of different computing environments.

In development of computer systems and applications, testing is frequently necessary to determine if a computer system or application operates as designed or intended. Such testing may be facilitated by configuring, provisioning and operating virtual machines. A virtual machine may be a computer system or application which is implemented upon another computer system for purposes of running the target machine (i.e., the virtual machine) for testing, development, or other purposes. It may also be useful to provision a virtual machine upon a host machine so that a particular computer system or application may be run or operated without the necessity of a dedicated machine to host the target system or application.

Configuring or provisioning a virtual machine may often be difficult and time-consuming. The process of creating and customizing virtual machines often still involves a large number of manual steps. Some of these steps may be complicated and/or difficult, even for seasoned computer professionals. For one-time or occasional users, overcoming these difficulties might be tolerable. But for users who need to create, provision, or customize one or more virtual machines with some frequency (e.g., every day or multiple times per day), on the other hand, these difficulties may become overwhelming. Even when there is already a virtual machine description file a user might reuse, a user may still need to create and provision a new virtual machine, bring it up, rename it and join its domain manually.

If a user desires to customize a virtual machine to his/her own needs (e.g. configure a single machine sharepoint farm), he or she may have to manually install and configure each item of software on the virtual machine one by one. From a point when a user has a clean virtual machine to the point the virtual machine is fully configured to user's needs, there might be more than 20 steps involved, each one possibly complicated and/or difficult. If a task required a user to do this every day, multiple times a day, or with some regularity, with even slight variations for each configured and provisioned virtual machine, this can be overwhelming.

BRIEF SUMMARY

Embodiments of the present invention extend to methods, systems, and computer program products for setting up, configuring, and customizing one or more virtual and/or physical machines. Embodiments of the invention extend to a provisioning engine which is a solution designed to help users setup and customize one or more virtual and/or physical machines. In one embodiment, a provisioning engine includes a command-line executable and a server side infrastructure.

In one embodiment of the invention, a method is provided for setting up, configuring, and customizing one or more virtual machines. This method may be performed upon computing equipment including one or more computer processors and computer system memory or data storage. The method includes accessing a virtual machine scenario definition file defining the characteristics of one or more virtual machines. The method also includes parsing the virtual machine scenario definition file to determine information defining a virtual machine. The method also includes providing to a virtual machine provisioning server the information defining the virtual machine such that the provisioning server passes a request to a virtual machine host which instantiates the virtual machine. And the method also includes communicating with a custom action service of the virtual machine provisioning server to cause an action to execute upon the virtual machine.

Embodiments of the invention may also include computer program products for setting up, configuring, and customizing one or more virtual machines. Such computer program products may include computer-readable media having encoded thereon instructions which may be executed upon one or more computer processors. When such instructions are executed, they may perform particular acts or steps. Such acts and/or steps may include accessing a virtual machine scenario definition file defining the characteristics of one or more virtual machines. Such acts may also include parsing the virtual machine scenario definition file to determine information defining a virtual machine. Such acts may also include providing to a virtual machine provisioning server the information defining the virtual machine such that the provisioning server passes a request to a virtual machine host which instantiates the virtual machine. Such acts may also include communicating with a custom action service of the virtual machine provisioning server to cause an action to execute upon the virtual machine.

Embodiments of the invention may also include other methods for setting up, configuring, and customizing one or more virtual machines. These other methods may also be performed upon computing equipment including one or more computer processors and computer system memory or data storage. Such a method may include accessing a virtual machine scenario definition file defining the characteristics of one or more virtual machines. The method also may include parsing the virtual machine scenario definition file to determine information defining a virtual machine, the scenario file identifying one or more template files, the template files defining a particular type of virtual machine and the template files comprising a pre-configured remoting shell such that, when a virtual machine has been created from at least one of the templates, it may be immediately connected to for communication and/or customization.

The method also may include providing to a virtual machine provisioning server the information defining the virtual machine such that the provisioning server passes a request to a virtual machine host which instantiates the virtual machine. And the method may include communicating with a custom action service of the virtual machine provisioning server to cause an action to execute upon the virtual machine. The method may also include connecting to and communicating with the virtual machine.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention extend to methods, systems, and computer program products for setting up, configuring, and customizing one or more virtual and/or physical machines. Embodiments of the invention extend to a provisioning engine which is a solution designed to help users setup and customize one or more virtual and/or physical machines. In one embodiment, a provisioning engine includes a command-line executable and a server side infrastructure.

In one embodiment of the invention, a method is provided for setting up, configuring, and customizing one or more virtual machines. This method may be performed upon computing equipment including one or more computer processors and computer system memory or data storage. The method includes accessing a virtual machine scenario definition file defining the characteristics of one or more virtual machines. The method also includes parsing the virtual machine scenario definition file to determine information defining a virtual machine. The method also includes providing to a virtual machine provisioning server the information defining the virtual machine such that the provisioning server passes a request to a virtual machine host which instantiates the virtual machine. And the method also includes communicating with a custom action service of the virtual machine provisioning server to cause an action to execute upon the virtual machine.

Embodiments of the invention may also include computer program products for setting up, configuring, and customizing one or more virtual machines. Such computer program products may include computer-readable media having encoded thereon instructions which may be executed upon one or more computer processors. When such instructions are executed, they may perform particular acts and/or steps. Such acts may include accessing a virtual machine scenario definition file defining the characteristics of one or more virtual machines. Such acts may also include parsing the virtual machine scenario definition file to determine information defining a virtual machine. Such acts may also include providing to a virtual machine provisioning server the information defining the virtual machine such that the provisioning server passes a request to a virtual machine host which instantiates the virtual machine. Such acts may also include communicating with a custom action service of the virtual machine provisioning server to cause an action to execute upon the virtual machine.

Embodiments of the invention may also include other methods for setting up, configuring, and customizing one or more virtual machines. Such other methods may be performed upon computing equipment including one or more computer processors and computer system memory or data storage. Such a method may include accessing a virtual machine scenario definition file defining the characteristics of one or more virtual machines. The method also may include parsing the virtual machine scenario definition file to determine information defining a virtual machine, the scenario file identifying one or more template files, the template files defining a particular type of virtual machine and the template files comprising a pre-configured remoting shell such that, when a virtual machine has been created from at least one of the templates, it may be immediately connected to for communication and/or customization.

The method also may include providing to a virtual machine provisioning server the information defining the virtual machine such that the provisioning server passes a request to a virtual machine host which instantiates the virtual machine. And the method may include communicating with a custom action service of the virtual machine provisioning server to cause an action to execute upon the virtual machine. The method may also include connecting to and communicating with the virtual machine.

Embodiments of the present invention may connect a shell with a virtual machine manager and virtual machine templates. An example may be to connect a Microsoft PowerShell 2.0 remoting feature with System Center Virtual Machine Manager's (SCVMM) virtual machine templates. The SCVMM virtual machine template may have PowerShell 2.0 installed and configured to allow remoting. When a new virtual machine has been created using SCVMM, a provisioning engine will be able to connect to the new virtual machine immediately and start to do customization on the virtual machine.

Embodiments of the present invention may also be used for provisioning multiple machines in an environment. For example, as well as (or instead of) provisioning a number of virtual machines, a system administrator may use an embodiment of the present invention to provision a number of actual or physical machines in an office to comprise a particular operating system, particular configuration settings, and a particular suite of productivity software. In this sense, the virtual machine that is provisioned may actually be a real office or production machine.

In the case of provisioning actual machines (such as, for example, in an office), the scenario definition file may comprise information identifying an operating system and a suite of productivity software which an administrator desires to be deployed upon each machine in the office environment.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions may be physical storage media. Computer-readable media that carry computer-executable instructions may be transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
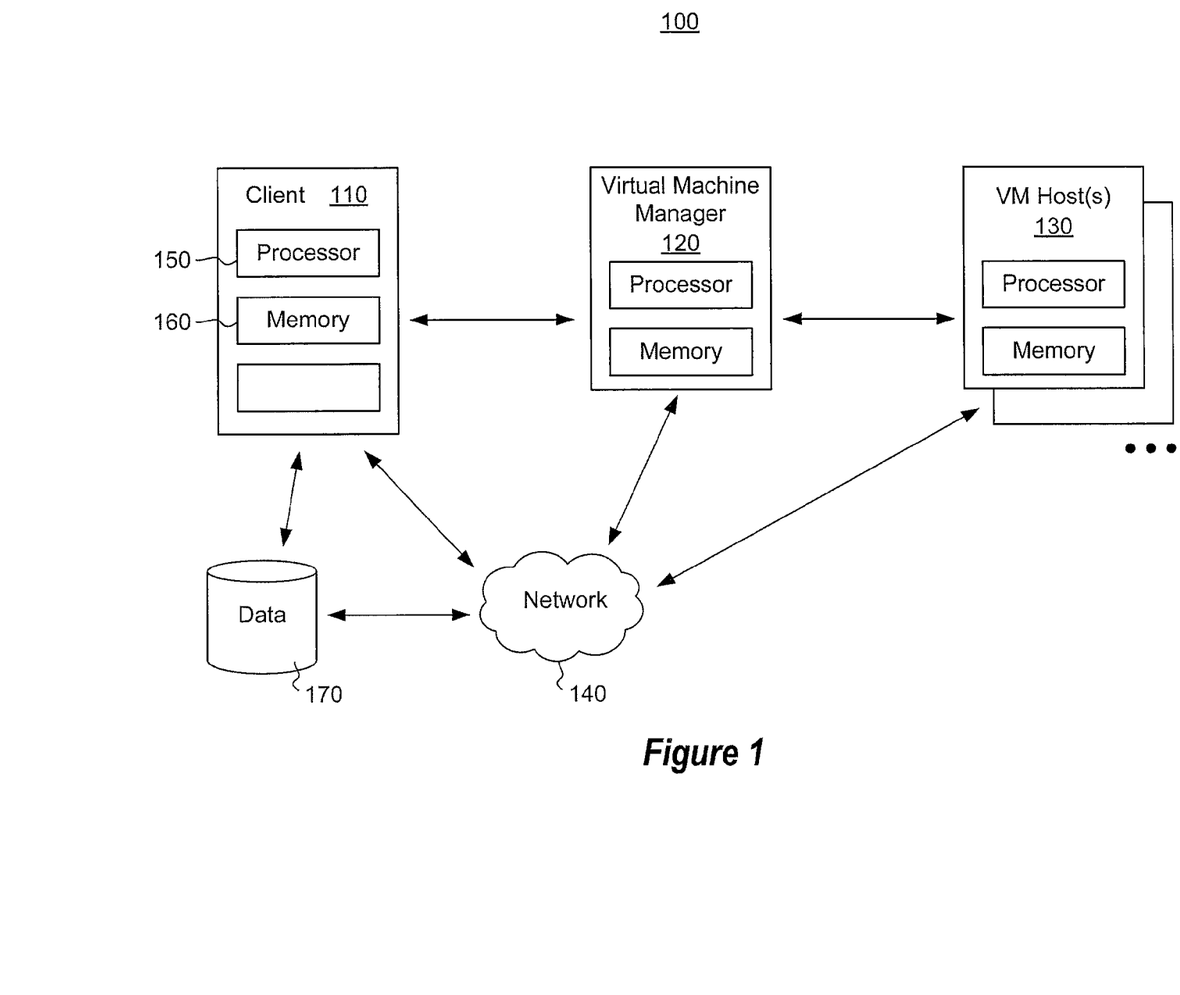
FIG. 1 illustrates an example computer architecture that facilitates setting up, configuring, and customizing one or more virtual machines.

FIG. 1 illustrates an example computer architecture 100 that facilitates setting up, configuring, and customizing one or more virtual machines. Referring to FIG. 1, computer architecture 100 includes a client computer system 110, a virtual machine management server 120 and one or more virtual machine hosts 130. Each of systems client computer system 110, virtual machine management server 120, and one or more virtual machine hosts 130 may be separate or may be combined in any fashion on one or more actual physical computing machines. Further, the virtual machine host 130 may be a single machine upon which multiple virtual machines may be instantiated, hosted, and run, the virtual machine host 130 may be a single machine upon which only a single virtual machine may be hosted, or the virtual machine host 130 may be any combination of one or more machines upon which one or more virtual machines may be hosted.

Each of the depicted computer systems may be connected to one another or to other entities or facilities over (or is part of) a network 140, such as, for example, a Local Area Network ("LAN"), a Wide Area Network ("WAN"), and even the Internet. Each of the systems may also be directly connected with one or more of each other. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Each of systems client computer system 110, virtual machine management server 120, and one or more virtual machine hosts 130 may also comprise one or more computer processors 150. Further, each of systems client computer system 110, virtual machine management server 120, and one or more virtual machine hosts 130 may also comprise may comprise computer memory 160 or data storage. The memory or data storage may be volatile or non-volatile and/or permanent or non-permanent. The memory or data storage may be locally resident or may be remotely accessed from another data store 170, database, or similar repository of data. Data may also be accessed from or stored to a remote data store from any of the computing entities 110, 120, and/or 130 via the network 140 or via a direct connection. Of course, each of the systems may also comprise any number of components, both hardware and software, which are not explicitly depicted in the figure but which are well known to those practicing in the art.

Figure 2:
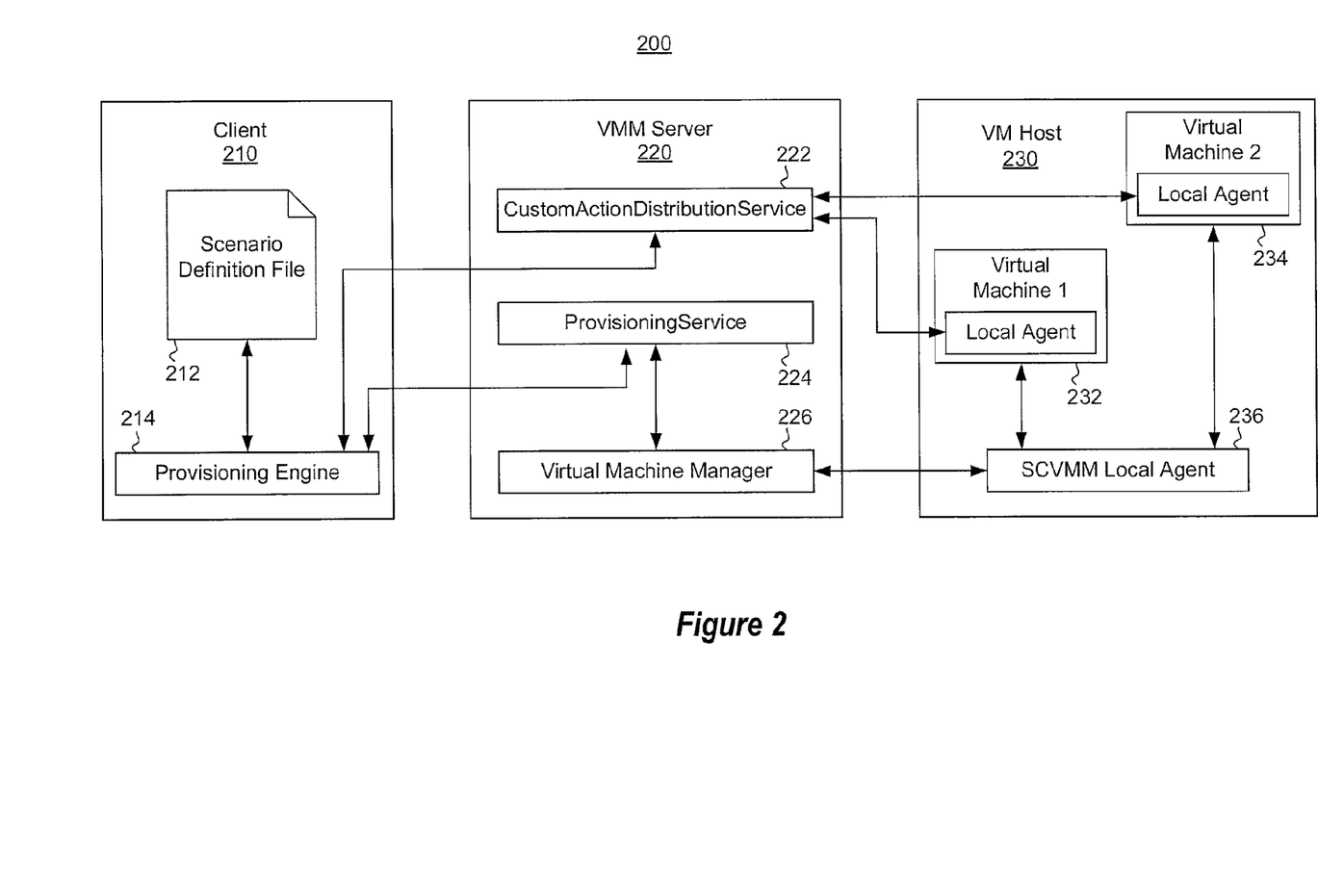
FIG. 2 illustrates an example component architecture that facilitates setting up, configuring, and customizing one or more virtual machines.

FIG. 2 illustrates an example component architecture that facilitates setting up, configuring, and customizing one or more virtual machines. The component architecture may include a client 210, a virtual machine manager 220, and a virtual machine host 230. The client 210, a virtual machine manager 220, and a virtual machine host 230 may correspond to the systems 110, 120, and 130 of FIG. 1. However, the components 210, 220, and 230, depicted in FIG. 2 are depicted in a functional way and may also be distributed upon other systems or hardware in addition to that depicted by FIG. 1. Therefore, FIGS. 1 and/or 2 should be considered illustrative but should not be considered limiting.

FIG. 2 also includes components which be discussed in additional detail throughout. Such components may include a scenario definition file 212, a provisioning engine 214, an action distribution service 222, a provisioning service 224, a virtual machine manager 226, one or more virtual machines 232 and 234, and a virtual machine manager local agent 236.

Figure 3:
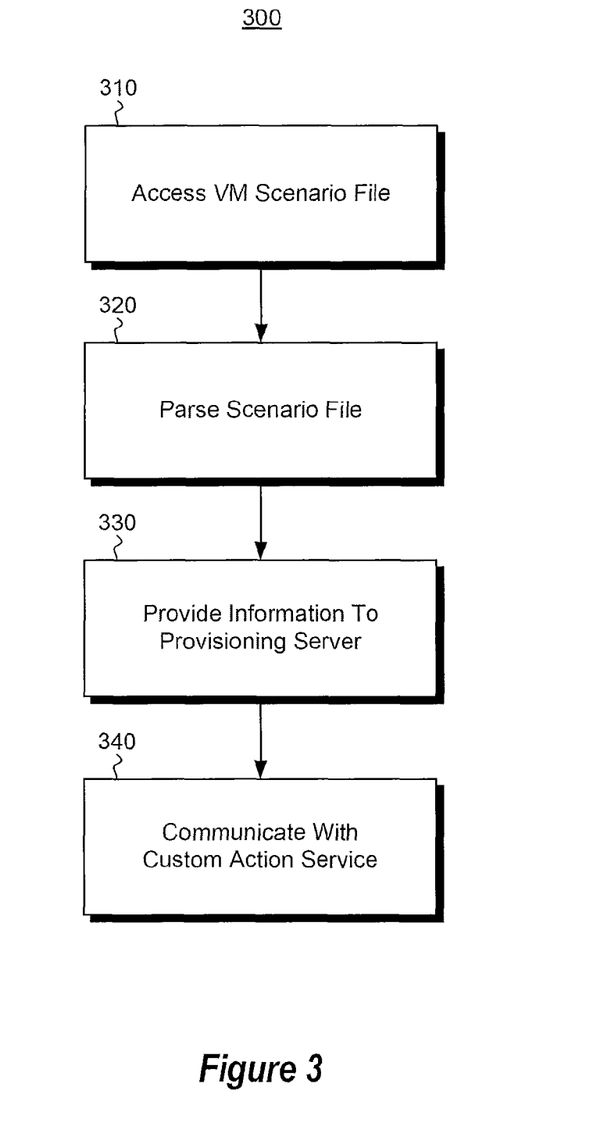
FIG. 3 illustrates a flow chart of an example method for setting up, configuring, and customizing one or more virtual machines.

FIG. 3 depicts a method 300 for setting up, configuring, and customizing one or more virtual machines. Method 300 will be described with respect to the architecture, components, and data of computer architecture 100 and components 200 of FIGS. 1 and 2.

Method 300 is a method for setting up, configuring, and customizing one or more virtual machines. This method may be performed upon computing equipment including one or more computer processors and computer system memory or data storage. The method may include accessing 310 a virtual machine scenario definition file defining the characteristics of one or more virtual machines. In some embodiments, a scenario definition file may be an XML schema file.

A scenario definition file may describe a single virtual machine or may describe a plurality of virtual machines. Further, a scenario definition file may describe one or more dependencies between two or more virtual machines. Further still, in some embodiments, a scenario file may identify one or more template files where the template files define a particular type of virtual machine. A particular type of virtual machine may comprise particular hardware (e.g., CPU and memory configuration) and particular software (e.g., a particular operating system (OS), peripheral hardware and drivers, and/or application software).

In some embodiments, a scenario file may identify one or more template files. The template files may define a particular type of virtual machine and the template files may comprise a pre-configured remoting shell such that, when a virtual machine has been created from at least one of the templates, it may be immediately connected to for communication and/or customization.

The method also may include parsing the virtual machine scenario definition file 320 to determine information defining a virtual machine. The method also includes providing 330 to a virtual machine provisioning server the information defining the virtual machine such that the provisioning server passes a request to a virtual machine host which instantiates the virtual machine.

The method may also include communicating 340 with a custom action service of the virtual machine provisioning server to cause an action to execute upon the virtual machine. In some embodiments, communicating 340 with a custom action service of the virtual machine provisioning server includes using a Simple Object Access Protocol (SOAP) based, firewall-friendly protocol. As described above, a scenario definition file may comprise dependencies. In some embodiments, a first virtual machine may await a dependency upon a second virtual machine to be satisfied before completing a custom action.

In some embodiments, a custom action service uses a remoting channel of a remote management service. For example, a custom action service may comprise using a remoting channel using Microsoft Windows remote management.

For example, referring to FIG. 2, a scenario definition file 212 may be accessed. Once accessed, the scenario definition file may be parsed and validated by a provisioning engine 214. The provisioning engine may then pass one or more requests to a provisioning service 224. The provisioning service may be part of a virtual machine manager server 220. The requests may include requests such as create, start, stop, delete, and take snapshot (of a virtual machine). The provisioning engine may also provide data and information with or in addition to the requests in order to facilitate the requests.

The virtual machine manager server may then pass one or more commands to a virtual machine manager local agent running upon a virtual machine host 230. The local agent may communicate with a local virtual machine manager to actually instantiate a virtual machine upon the virtual machine host. The virtual machine instantiated upon the virtual machine host would be in accordance with the data and information contained in the scenario definition file.

The provisioning engine 214 may also communicate with a custom action distribution service 222 running on the virtual machine manager server 220. Such communication may be used to distribute custom actions to a virtual machine instantiated upon a virtual machine host. The custom action distribution service may then set up a remoting channel with each virtual machine (such as virtual machine 1 232 or virtual machine 2 234 running within the virtual machine host 230). Once the remoting channel is set up with a virtual machine, the custom action may be executed upon the virtual machine.

A provisioning engine 214 may be a console application which may execute upon a client machine 210. The provisioning engine may understand the format and contents of a scenario definition file 212 and may control the logic of creating a virtual machine and running custom actions.

Steps in an example provisioning process of one embodiment may include:
  Step 1: Validate a scenario definition file against a Scenario Definition template definition file;
  Step 2: Parse the scenario definition file into an object model;
  Step 3: For each machine defined in the scenario definition file, create a thread to start a provisioning process (for an actual physical machine, the creation process may be skipped);
  Step 4: Start the machine after it has been created (for an actual physical machine, this step may be skipped);
  Step 5: Connect to the machine after it has been started;
  Step 6: Begin to execute the custom actions which are defined in the scenario definition file for the machine. The order of the execution of multiple actions may depend on the dependencies defined in the scenario definition file.

A provisioning service 224 may be a web service. The provisioning service function may be to provide the service for end users to create new virtual machines, stop and start virtual machines, and/or remove virtual machines from hosts. This web service may call a virtual machine manager's shell commands to perform its tasks. An example may be Microsoft's PowerShell cmdlets.

A custom action distribution service may also be a web service. The function of the custom action distribution service may be to setup connections between a server which host this service and a virtual machine a user has created. The custom action distribution service may be responsible to execute the custom actions a user has defined in a scenario definition file on the target virtual machine and collect results returned from the execution. For example, this web service may use a Microsoft PowerShell remoting feature to communicate with other machines.

A local shell with remoting capability may be used. This may be used to execute custom actions remotely on a target virtual machine. A local agent 236 may, by way of example but not limitation, use Microsoft PowerShell as the local agent.

A template may be a sysprepped virtual machine and a provisioning engine may use a template to create virtual machines. Before a user employs a provisioning engine, a system administrator may create several templates to meet a user's requirements. By using templates, a user may describe in a scenario definition file the custom configuration of a template-based virtual machine. This scenario definition file may then be used to customize and instantiate a virtual machine according to the user's wishes.

Embodiments of the invention as described herein may also include computer program products. Such computer program products may comprise computer-executable instructions which are encoded upon physical computer storage media. Computer program products may also comprise computer-executable instructions which may be transmitted over data transmission media (for example, for storage or execution at a remote location). Such computer-executable instructions, when executed upon one or more computer processors, may cause the processors to perform the steps, acts, and/or methods which are described herein.

Embodiments of the present invention also include methods for setting up, configuring, and customizing one or more virtual machines. Such a method may be performed upon computing equipment including one or more computer processors and computer system memory or data storage. The method may include accessing a virtual machine scenario definition file defining the characteristics of one or more virtual machines. The method also may include parsing the virtual machine scenario definition file to determine information defining a virtual machine, the scenario file identifying one or more template files, the template files defining a particular type of virtual machine and the template files comprising a pre-configured remoting shell such that, when a virtual machine has been created from at least one of the templates, it may be immediately connected to for communication and/or customization.

The method also may include providing to a virtual machine provisioning server the information defining the virtual machine such that the provisioning server passes a request to a virtual machine host which instantiates the virtual machine. And the method may include communicating with a custom action service of the virtual machine provisioning server to cause an action to execute upon the virtual machine. The method may also include connecting to and communicating with the virtual machine.

Scenario Definition File

Some embodiments of the present invention utilize a scenario definition file to facilitate the provisioning of a virtual machine. A scenario definition file may be created and/or edited by a user or provided by some other source such as local storage or a database. A scenario definition file may also be created and/or supplied by an automated process.

A scenario definition file may include some or all of the following data fields, constructs, or data members:

Role: role is used to describe a group of virtual machines that share a common template. Each role may have a unique name. For physical machines, a role may be optional.

Machine: a machine represents a virtual machine that is going to be created upon a host machine or an actual physical machine that going to be customized. Each machine may have a unique name. A user may provide a machine name that is going to be a real virtual machine name on the network. (It may be worthwhile to ensure machine is not providing a duplicated name with an existing virtual machine.) Each machine may also reference a certain role. Domain may be the domain which the virtual machine will join automatically.

Host: host is a physical machine that a virtual machine is going to be created on. A host must be managed by a provisioning engine infrastructure. A user should provide a hilly qualified domain name (FQDN) for a host. Host is optional for actual physical machines (which, for example, may already have an FQDN).

Template: the template is a sysprepped virtual machine. It may be used as a template to create a virtual machine. Choosing a template to use will dictate the real operating system which will be instantiated on a machine and the software that is to be installed on the virtual machine.

isVirtual: isVirtual identifies whether a machine is to be a virtual machine or an actual machine. By default, isVirtual is set to true. For actual physical machines, isVirtual may be set to false.

HardwareProfile: HardwareProfile is the hardware configuration of the target machine. HardwareProfile also may include cpuCount and cpuType. cpuCount and cpuType do not necessarily mean a real CPU that a virtual machine is going to have. cpuCount and cpuType may be used as an indicator of how powerful a virtual machine may be desired to be. Actual performance of a virtual machine may depend on which host a virtual machine has been created on, how many virtual machines may be on that host, and how powerful the host actually is. (For example, if a "powerful" virtual machine is configured and instantiated on a less powerful actual machine, the virtual machine will get performance only up to the actual performance of the actual machine acting as the host for the virtual machine.)

memoryMB: memoryMB may indicate the real amount of memory a virtual machine is going to get. The memoryMB amount should not exceed the host's actual total memory. A provisioning engine may provide default settings for memory, cpuType and cpuCount if such parameters are omitted. For example, cpuCount may be 2, cpuType may be 2.4 GHz Xeon, and memoryMB may be 4096 (4 GB).

CustomAction: CustomAction is an action desired to execute on a virtual machine after it has been created on a host machine. CustomAction may be used to customize a virtual machine. Each customAction should have a unique ID for the machine. The real action may be a shell scriptblock which will be executed on the machine after having been created. One or more input parameters may be specified for a scriptblock. One or more custom actions may be executed in an order as they are defined in a scenario file.

Dependencies: each customAction may have dependencies. A dependency means that the custom action will not be executed if the dependent custom action hasn't successfully completed yet. To create a dependency, it may be specified which machine is depended on and/or which custom action on that machine is depended on. An output parameter may be passed from a dependent custom action to the custom action of a virtual machine as an input parameter by using parameterMaps.

In some embodiments, a scenario definition file may be an organized according to an XML schema. An example of such an XML schema file may be illustrated by the following example:

```xml
<?xml version="1.0" encoding="utf-8" ?>
<xs:schema
    targetNamespace="http://microsoft.com/ProvisioningEngine/2010
    /02/ScenarioDefinition.xsd" elementFormDefault="qualified"
    xmlns="http://microsoft.com/ProvisioningEngine/2010/02/Scenar
    ioDefinition.xsd"
    xmlns:mstns="http://microsoft.com/ProvisioningEngine/2010/02/
    ScenarioDefinition.xsd"
    xmlns:xs="http://www.w3.org/2001/XMLSchema">
<xs:element name="scenario" type="ScenarioType">
<xs:key name="roleNameKey">
<xs:selector xpath="mstns:role" />
<xs:field xpath="mstns:name" />
</xs:key>
<xs:key name="machineNameKey">
<xs:selector xpath="mstns:machine" />
<xs:field xpath="mstns:name" />
</xs:key>
<xs:keyref name="machineRoleNameKeyRef" refer="roleNameKey">
<xs:selector xpath="mstns:machine" />
<xs:field xpath="mstns:role" />
</xs:keyref>
</xs:element>
<xs:complexType name="ScenarioType">
<xs:all>
<xs:element name="roles" type="RolesType" minOccurs="0" />
<xs:element name="machines" type="MachinesType"
    minOccurs="1" />
<xs:element name="globalVariables" type="GlobalVariablesType"
    minOccurs="0" />
<xs:element name="runAs" type="RunAsType" minOccurs="0" />
</xs:all>
</xs:complexType>
<xs:complexType name="RunAsType">
<xs:all>
<xs:element name="userName" type="xs:string" minOccurs="1"
    maxOccurs="1" />
<xs:element name="password" type="xs:string" minOccurs="1"
    maxOccurs="1" />
</xs:all>
</xs:complexType>
<xs:complexType name="GlobalVariablesType">
<xs:sequence>
<xs:element name="globalVariable" type="GlobalVariableType"
    minOccurs="0" maxOccurs="50" />
</xs:sequence>
</xs:complexType>
<xs:complexType name="GlobalVariableType">
<xs:simpleContent>
<xs:extension base="xs:string">
<xs:attribute name="name" type="xs:string" use="required" />
</xs:extension>
</xs:simpleContent>
</xs:complexType>
<xs:complexType name="MachinesType">
<xs:sequence>
<xs:element name="machine" type="MachineType" minOccurs="1"
    maxOccurs="50" />
</xs:sequence>
</xs:complexType>
<xs:complexType name="RolesType">
<xs:sequence>
<xs:element name="role" type="RoleType" minOccurs="0"
    maxOccurs="50" />
</xs:sequence>
</xs:complexType>
<xs:complexType name="MachineType">
<xs:all>
<xs:element name="host" type="MachineHostType" minOccurs="0" />
<xs:element name="runAs" type="RunAsType" minOccurs="0" />
<xs:element name="customActions" type="CustomActionsType"
    minOccurs="0">
<xs:key name="customActionIDKey">
<xs:selector xpath="mstns:customAction" />
<xs:field xpath="@id" />
</xs:key>
</xs:element>
</xs:all>
<xs:attribute name="name" type="xs:string" use="required" />
<xs:attribute name="description" type="xs:string" use="optional"
    />
<xs:attribute name="domain" type="xs:string" use="required" />
<xs:attribute name="isVirtual" type="xs:boolean" default="true"
    use="optional" />
<xs:attribute name="role" type="xs:string" use="optional" />
<xs:attribute name="isDisabled" type="xs:boolean" use="optional"
    default="false" />
</xs:complexType>
<xs:complexType name="CustomActionsType">
<xs:sequence>
<xs:element name="customAction" type="CustomActionType"
    minOccurs="0" maxOccurs="50" />
</xs:sequence>
<xs:attribute name="isDisabled" type="xs:boolean" default="false"
    />
</xs:complexType>
<xs:complexType name="CustomActionType">
<xs:all>
<xs:element name="runAs" type="RunAsType" minOccurs="0" />
<xs:element name="action" type="ActionType" minOccurs="1" />
<xs:element name="inputParameters" type="InputParametersType"
    minOccurs="0">
<xs:unique name="inputParameterNameKey">
<xs:selector xpath="mstns:inputParameter" />
<xs:field xpath="mstns:parameterName" />
</xs:unique>
</xs:element>
<xs:element name="dependencies" type="DependenciesType"
    minOccurs="0" />
</xs:all>
<xs:attribute name="id" type="xs:unsignedInt" use="required" />
<xs:attribute name="name" type="xs:string" use="required" />
<xs:attribute name="isDisabled" type="xs:boolean" use="optional"
    />
<xs:attribute name="ignoreFailureAndContinue" type="xs:boolean"
    use="optional" />
<xs:attribute name="timeOutInSeconds"
    type="xs:nonNegativeInteger" default="3600" use="optional" />
</xs:complexType>
<xs:complexType name="DependenciesType">
<xs:sequence>
<xs:element name="dependsOn" type="DependsOnType"
    minOccurs="0"
    maxOccurs="50" />
</xs:sequence>
</xs:complexType>
<xs:complexType name="DependsOnType">
<xs:sequence>
<xs:element name="parameterMap" type="ParameterMapType"
    maxOccurs="10" minOccurs="0" />
</xs:sequence>
<xs:attribute name="machine" type="xs:string" use="required" />
<xs:attribute name="customAction" type="xs:unsignedInt"
    default="0" use="optional" />
</xs:complexType>
<xs:complexType name="ParameterMapType">
<xs:attribute name="outputParameterName" type="xs:string"
    use="required" />
<xs:attribute name="inputParameterName" type="xs:string"
    use="required" />
</xs:complexType>
<xs:complexType name="InputParametersType">
<xs:sequence>
<xs:element name="inputParameter" type="InputParameterType"
    minOccurs="0" maxOccurs="50" />
</xs:sequence>
</xs:complexType>
<xs:complexType name="InputParameterType">
<xs:simpleContent>
```

-continued

```
- <xs:extension base="xs:string">
    <xs:attribute name="name" type="xs:string" use="required" />
  </xs:extension>
  </xs:simpleContent>
  </xs:complexType>
- <xs:complexType name="RoleType">
- <xs:all>
    <xs:element name="hardwareProfile" type="HardwareProfileType"
        minOccurs="0" />
  </xs:all>
    <xs:attribute name="name" type="xs:string" use="required" />
    <xs:attribute name="description" type="xs:string" use="optional"
        />
    <xs:attribute name="template" type="xs:string" use="required" />
  </xs:complexType>
- <xs:complexType name="HardwareProfileType">
- <xs:all>
    <xs:element name="cpuCount" type="CPUCountType" default="2"
        minOccurs="0" />
    <xs:element name="cpuType" type="xs:string" default="2.40 GHz
        Xeon" minOccurs="0" />
    <xs:element name="memoryMB" type="MemoryMBType"
        default="4096"
        minOccurs="0" />
  </xs:all>
  </xs:complexType>
- <xs:complexType name="MachineHostType">
- <xs:simpleContent>
- <xs:extension base="xs:string">
    <xs:attribute name="vmPath" type="xs:string" use="optional" />
  </xs:extension>
  </xs:simpleContent>
  </xs:complexType>
- <xs:simpleType name="CPUCountType">
- <xs:restriction base="xs:integer">
    <xs:minInclusive value="1" />
    <xs:maxInclusive value="8" />
  </xs:restriction>
  </xs:simpleType>
- <xs:simpleType name="MemoryMBType">
- <xs:restriction base="xs:integer">
    <xs:minInclusive value="512" />
    <xs:maxInclusive value="65536" />
  </xs:restriction>
  </xs:simpleType>
- <xs:complexType name="ActionType">
- <xs:choice>
    <xs:element name="execute" type="xs:string" />
    <xs:element name="takeSnapshot" type="xs:string" />
    <xs:element name="restoreSnapshot" type="xs:string" />
    <xs:element name="reboot" type="RebootType" />
  </xs:choice>
  </xs:complexType>
  <xs:complexType name="RebootType" />
  </xs:schema>
```

It should be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for setting up, configuring, and customizing one or more virtual machines, the method performed at a computer system including one or more processors and data storage, the method comprising:

accessing a virtual machine scenario definition file defining the characteristics of one or more virtual machines, the virtual machine scenario definition file comprising the data fields: Role, Machine, Host, and Template, Role being used to describe a group of virtual machines that share a common template, Machine representing a virtual machine that is going to be created upon a host machine or an actual physical machine that is going to be customized, Host being a physical machine that a virtual machine is going to be created on, Template being a system prepped virtual machine;

parsing the virtual machine scenario definition file, including each of the data fields, to determine information defining a virtual machine;

providing to a virtual machine provisioning server the information defining the virtual machine such that the provisioning server passes a request to a virtual machine host which instantiates the virtual machine; and communicating with a custom action service of the virtual machine provisioning server to cause an action to execute upon the virtual machine.

2. The method of claim 1 wherein the virtual machine scenario definition file is an XML schema file.

3. The method of claim 1 wherein communicating with the custom action service comprises using a Simple Object Access Protocol (SOAP) based, firewall-friendly protocol.

4. The method of claim 1 wherein the custom action service comprises using a remoting channel using Windows remote management.

5. The method of claim 1 wherein the virtual machine scenario definition file describes a plurality of virtual machines.

6. The method of claim 1 wherein the virtual machine scenario definition file describes a plurality of virtual machines and one or more dependencies between at least two of the plurality of virtual machines.

7. The method of claim 5 wherein a first virtual machine awaits a dependency upon a second machine to be satisfied before completing a custom action.

8. The method of claim 1 wherein the scenario file identifies one or more template files, the template files defining a particular type of virtual machine.

9. The method of claim 1 wherein the scenario file identifies one or more template files, the template files defining a particular type of virtual machine and the template files comprising a pre-configured remoting shell such that, when a virtual machine has been created from at least one of the templates, it may be immediately connected to for communication and/or customization.

10. A computer program product for setting up, configuring, and customizing one or more virtual machines, the computer program product comprising one or more computer readable hardware storage devices having encoded thereon computer executable instructions for performing a method at a computer system including one or more processors, the method comprising:

accessing a virtual machine scenario definition file defining the characteristics of one or more virtual machines, the virtual machine scenario definition file comprising the data fields: Role, Machine, Host, and Template, Role being used to describe a group of virtual machines that share a common template, Machine representing a virtual machine that is going to be created upon a host machine or an actual physical machine that is going to be customized, Host being a physical machine that a virtual machine is going to be created on, Template being a system prepped virtual machine;

parsing the virtual machine scenario definition file, including each of the data fields, to determine information defining a virtual machine;

providing to a virtual machine provisioning server the information defining the virtual machine such that the provisioning server passes a request to a virtual machine host which instantiates the virtual machine; and communicating with a custom action service of the virtual machine provisioning server to cause an action to execute upon the virtual machine.

11. The computer program product of claim 10 wherein the virtual machine scenario definition file is an XML schema file.

12. The computer program product of claim 10 wherein communicating with the custom action service comprises using a Simple Object Access Protocol (SOAP) based, firewall-friendly protocol.

13. The computer program product of claim 10 wherein the custom action service comprises using a remoting channel using Windows remote management.

14. The computer program product of claim 10 wherein the virtual machine scenario definition file describes a plurality of virtual machines.

15. The computer program product of claim 10 wherein the virtual machine scenario definition file describes a plurality of virtual machines and one or more dependencies between at least two of the plurality of virtual machines.

16. The computer program product of claim 10 wherein a first virtual machine awaits a dependency upon a second machine to be satisfied before completing a custom action.

17. The computer program product of claim 10 wherein the scenario file identifies one or more template files, the template files defining a particular type of virtual machine.

18. The computer program product of claim 10 wherein the scenario file identifies one or more template files, the template files defining a particular type of virtual machine and the template files comprising a pre-configured remoting shell such that, when a virtual machine has been created from at least one of the templates, it may be immediately connected to for communication and/or customization.

19. A method for setting up, configuring, and customizing one or more virtual machines, the method performed at a computer system including one or more processors and data storage, the method comprising:

accessing a virtual machine scenario definition file defining the characteristics of one or more virtual machines, the virtual machine scenario definition file comprising the data fields: Role, Machine, Host, and Template, Role being used to describe a group of virtual machines that share a common template, Machine representing a virtual machine that is going to be created upon a host machine or an actual physical machine that is going to be customized, Host being a physical machine that a virtual machine is going to be created on, Template being a system prepped virtual machine;

parsing the virtual machine scenario definition file, including each of the data fields, to determine information defining a virtual machine, the scenario file identifying one or more template files, the template files defining a particular type of virtual machine and the template files comprising a pre-configured remoting shell such that, when a virtual machine has been created from at least one of the templates, it may be immediately connected to through the pre-configured remoting shell for communication and/or customization;

providing to a virtual machine provisioning server the information defining the virtual machine such that the provisioning server passes a request to a virtual machine host which instantiates the virtual machine;

communicating with a custom action service of the virtual machine provisioning server to execute an action upon the virtual machine;

connecting to and communicating with the virtual machine.

20. The method of claim 19 wherein the virtual machine scenario definition file describes a plurality of virtual machines.

* * * * *